United States Patent [19]

Heiberger

[11] 4,293,471

[45] Oct. 6, 1981

[54] FAST-DRYING ALKYD LATEX

[75] Inventor: Philip Heiberger, Broomall, Pa.

[73] Assignee: E. I. Du Pont de Nemours and Company, Wilmington, Del.

[21] Appl. No.: 159,793

[22] Filed: Jun. 16, 1980

Related U.S. Application Data

[63] Continuation of Ser. No. 20,985, Mar. 16, 1979, abandoned.

[51] Int. Cl.³ .................. C09D 3/64; C09D 3/66; C09D 5/02
[52] U.S. Cl. .................. 260/22 CB; 260/22 CA; 260/23 P; 260/29.2 E; 260/29.6 NR; 260/29.6 T
[58] Field of Search ............ 260/22 CB, 23 P, 29.2 E, 260/29.6 NR, 29.6 T, 22 CA

[56] References Cited

U.S. PATENT DOCUMENTS

| | | | |
|---|---|---|---|
| 3,699,065 | 10/1972 | Clark | 260/29.2 E |
| 4,051,089 | 9/1977 | Tobias et al. | 260/29.2 E |
| 4,081,411 | 3/1978 | Hunsucker | 260/22 R |
| 4,116,903 | 9/1978 | Lietz et al. | 260/29.2 E |
| 4,133,786 | 1/1979 | Harris et al. | 260/22 CB |

FOREIGN PATENT DOCUMENTS 52-102390  8/1977  Japan .

OTHER PUBLICATIONS

Solomon, The Chemistry of Organic Film Formers, Robert E. Krieger Publishing Co., (1977), pp. 297–303.
The Condensed Chemical Dictionary, Reinhold, (1956), p. 144.
Bovey, Emulsion Polymerization, 1955: Interscience Publishers, Inc., N.Y., N.Y., pp. 65, 66 and 67.

*Primary Examiner*—Ronald W. Griffin
*Attorney, Agent, or Firm*—James H. Ryan

[57] ABSTRACT

Stable coating compositions are made from an aqueous dispersion of an alkyd resin (20–80% by weight of solids) neutralized to a pH of about 7.5 with ammonia or a volatile amine by forming therein an emulsion polymer (80–20% by weight of solids) of one or more vinyl monomers. When coated on a substrate, the compositions dry readily like vinyl emulsion polymers but with a glossy and durable finish like the relatively cheap alkyds. Free radical catalysts, e.g., peroxides, may be encapsulated during the emulsion polymerization and remain stable until evaporation of water.

10 Claims, No Drawings

FAST-DRYING ALKYD LATEX

CROSS REFERENCE TO RELATED APPLICATION

This is a continuation of application Ser. No. 020,985, filed Mar. 16, 1979, and now abandoned.

BACKGROUND OF THE INVENTION

1. Field of the Invention

This invention is an emulsion polymer of water-compatible alkyd resins with vinyl monomers, formed via an emulsion polymerization process in an aqueous alkyd resin solution, which retains the water-compatible and gloss properties of the alkyd and the fast dry and surface-protective properties of the vinyl polymer.

2. Prior Art

Japanese Pat. No. 102,390 of 1977 discloses the formation of vinyl colloid emulsions in a dispersion of a post-maleated high oil-modified alkyd resin neutralized with a tertiary organic amine as a dispersion stabilizer. This patent also discloses standard procedures and materials for preparing alkyds and emulsions.

DESCRIPTION OF THE INVENTION

It is desirable for environmental and other reasons to reduce or eliminate the use of volatile organic solvents in the coating industry. Water-borne materials such as some alkyds thus become attractive. In practice, however, the alkyds develop film hardness slowly. Emulsion polymers exhibit good drying properties but film appearance is poor. Mixtures of emulsions and waterborne alkyds do improve the drying properties of the latter, but these mixtures are unstable and poor in appearance.

It has been found that the drying properties of alkyds can be improved without deleterious effects on gloss by a process in which: (1) a water-dispersible alkyd resin is formed by conventional procedures; (2) the aqueous suspension of the alkyd is neutralized to about pH 7.5 (6-9) with ammonia or volatile amine, readily forming a soap; and (3) a vinyl emulsion polymer is produced directly in the thus-neutralized suspension by substantially conventional emulsion polymerization methods. The weight ratio of alkyd/vinyl monomers in the solids content of the resulting emulsion is preferably about 1/1, varying from about 80/20 to 20/80. The total solids content of the emulsion is about 30-50% by weight.

In addition, it has been unexpectedly found that if a small amount of a free radical-generating catalyst, e.g., a peroxide such as benzoyl peroxide, is added during the emulsion polymerization step, films of the alkyd-latex product dry without an induction period, that is, oxygen-induced hydroperoxide is formed without marked delay.

As noted, the alkyd resins of this invention are formed from conventional materials, i.e., polyhydric alcohols, polybasic acids and drying oils or fatty acids. The basic ingredients of the preferred alkyd are trimethylol propane, soya fatty acids, isophthalic acid, trimellitic anhydride and maleic anhydride. Acid number of the product alkyd is also important, about 50 being preferred. An acid number much above 50 results in water-sensitive films while much below 50 results in gelation. The procedure for the preparation of the alkyd is entirely conventional, the desired materials merely being brought together and refluxed until the appropriate acid number is reached.

Although any volatile alkali may be used, ammonia is the preferred neutralization agent because it is the most volatile alkali and the one least likely to cause complications. Neutralization is carried out to a pH of about 6-9, 7.5 being preferred. A pH much above about 7.5 may retard polymerization while one much below requires more solvent to maintain stability. Volatile primary or secondary amines, e.g., methyl amine, dimethyl amine, ethyl amine, ethanolamine, etc., can be substituted for ammonia if desired.

The monomers used for the emulsion polymerization with the neutralized alkyd suspension may be any of those normally used for emulsion polymerization. Preferred are hydrophobic, or "hard" monomers, i.e., those giving nonplasticized products, such as methyl methacrylate, ethyl methacrylate, butyl methacrylate, styrene, α-methylstyrene, vinyl toluene, etc. A plurality of monomers in conventional fashion are preferred. Most preferred monomers are methyl methacrylate, butyl methacrylate, and vinyl toluene, all three of which result in clear, glossy and tough films. Conventional "soft" monomers such as ethyl acrylate, butyl acrylate, octyl acrylate, etc., can be included but are not needed since the alkyd soap itself functions as a plasticizer. It may be noted that acrylic monomers do not react as readily with the alkyd as do methacrylate monomers and vinyl toluene.

Emulsion polymerization in the neutralized alkyd suspension can be carried out at reflux, but a lower temperature, e.g., 30°-70° C., is preferred. Higher temperatures and higher pH's accelerate alkyd hydrolysis.

Addition of the selected monomers to the neutralized alkyd is carried out slowly, either continuously or incrementally, because bulk addition results in resin swelling and excessive initial viscosity. For the same reason, agitation of the reacting mixture at all times is essential. Otherwise, the emulsion polymerization is entirely conventional.

In practice and in order to destroy residual monomers in the product, a small amount of benzoyl peroxide was dissolved in the monomers and activated by raising the temperature briefly from 60°-90° C., i.e., above the critical decomposition temperature for this peroxide. Surprisingly, when the product alkyd-latex was used in film forming, it was found to dry, initially and after about 5 months' aging, without an induction period. Generally, conventional aqueous alkyds may require an induction period of as much as 28 hours. As a possible explanation of this phenomenon, and one to which I do not propose to be bound, it is suggested that, during polymerization, the emulsion polymer particles capture and encapsulate free radicals and/or unreacted peroxides. These become operative during paint film formation. The peroxides then collaborate with the cobalt drier used in the oxidative phase to initiate oxidative crosslinking. It is assumed that these "frozen" radicals are isolated in the polymer particle until film formation occurs. At that time, they mix in the film and react with the cobalt to form the classical cobalt-peroxide initiator.

Any solvent-soluble conventional peroxide catalyst with a critical temperatures of 40° C. or more may be used, e.g., t-butyl hydroperoxide, cumene peroxide, dicumyl peroxide, lauroyl peroxide, methyl ethyl ketone peroxide, etc., and can be activated by exposure to the conventional alkyd driers and oxygen in the air. The quantity of peroxide employed is not critical but may conveniently comprise 0.1-2.0% by weight of latex solids in the product. It is found that, on storage, the peroxide remains stable for at least 4-5 months.

There follow some examples illustrating the invention in more detail. In these examples, parts and percentages are by weight and temperatures are in degrees centigrade unless otherwise specified.

EXAMPLE 1

Methacrylate Latex-Modified Alkyd

A. Alkyd. In a typical glass resin reaction flask equipped with stirrer, thermometer, nitrogen inlet and condenser having a Dean-Stark water collector, the following were combined:

| Ingredient | Parts |
| --- | --- |
| Soya fatty acids | 3452.5 |
| Trimethylol propane | 3260.0 |
| Isophthalic acid | 2718.5 |
| Xylene (azeotroping solvent) | |

During 10 hours of reflux in the range 190°-220°, 858 ml of water was removed. The acid number of the product was 7.6, and the solids content was 93.4%.

To achieve alkali solubility, 1384.5 g of the above product was combined with 140.1 parts of trimellitic anhydride and 12.75 parts of maleic anhydride in an apparatus similar to that above. The mixture was brought to a temperature of 200° and held to an acid number of 49, 20 ml of water being collected. The alkyd product was dissolved in methyl ethyl ketone (MEK) to a solids content of 74%. The Gardner-Holdt viscosity was X.

B. Latex. In a flask equipped with stirrer, thermometer, nitrogen inlet, separatory funnel and reflux condenser were mixed the following:

| Ingredient | Parts |
| --- | --- |
| Alkyd MEK solution from A | 810.8 |
| Water | 1280.0 |
| Ammonia | (to pH = 7.5) |

The above mixture was heated to 60° and maintained at that temperature.

The following monomer mix was separately prepared and transferred to a funnel:

| Ingredient | Parts |
| --- | --- |
| Methyl methacrylate | 270.0 |
| Butyl methacrylate | 30.0 |
| Vinyl toluene | 100.0 |
| Benzoyl peroxide | 0.4 |

10% of the monomer mixture was added to the alkyd mixture at 60° along with 4 parts of ammonium persulfate, and 2 parts of sodium sulfite dissolved in 25 parts of water.

The remainder of the monomer mixture was then added dropwise to the alkyd over 2-3 hours. At the end of the addition, 1 part of ammonium persulfate and 0.5 part of sodium sulfite in 10 parts of water were added. The mixture was held at 60° for approximately 1 hour and then at 90° for 30 minutes more. The modified alkyd mixture was cooled to room temperature and the pH adjusted to 7.5. Constants of this latex-modified product were as follows:

| | | |
| --- | --- | --- |
| Particle size | = | uniform, spherical (ca. 0.1μ in diameter) |
| Alkyd/monomer ratio | = | 60/40 |
| Appearance | = | milky white dispersion |
| Final solids | = | 36.3% |
| Final pH | = | 7.6% |
| Theoretical conversion | = | 99+% (trace BMA odor) |

C. Film. The latex-modified product from B was catalyzed with 0.1% cobalt metal via a 6% cobalt naphthenate solution. A thin film was prepared by spreading the product on glass with a doctor blade. A 1.5 mil dry film became gasoline- and water-resistant after an overnight dry.

EXAMPLE 2

Paint

A. Millbase. To a mixture of:

| Ingredient | Parts |
| --- | --- |
| Alkyd from Example 1A | 18.5 |
| Water | 13.6 |
| Ethylene glycol monobutyl ether (EGME) | 8.8 |
| Ammonia (28%) in water | (to pH − 7.5) | was added titanium dioxide (2 parts), ferrite yellow (10 parts), chrome yellow (37 parts) and molybdate orange (1 part). The resultant composition was mixed and dispersed through a sand mill.

B. Paint Preparation. A mixture was made up from:

| Ingredient | Parts |
| --- | --- |
| EGME | 15.0 |
| Methyl ethyl ketoxime | 0.2 |
| 12% zirconium drier | 1.9 |
| 6% calcium drier | 2.5 |
| 4/1 water/EGME | 25.00 |

To this mixture was added 135.4 parts of the millbase prepared above. These ingredients were mixed well and 212.7 parts of latex from Example 1B and 2.5 parts of a 6% cobalt drier solution were added thereto to complete the paint. Paint constants were: P/B=65/100; Viscosity=60 sec on Zahn #2 cup; Co/Ca/Zr drier ratio=0.15/0.15/0.225.

C. Cure. The paint prepared above was sprayed over a steel panel to achieve a 1.5-mil dry film, then allowed to stand overnight. The paint was dry within 1 hour. The following properties were achieved overnight:

| | | |
| --- | --- | --- |
| Overnight pencil hardness | = | HB |
| Water resistance | = | Satisfactory |
| Gasoline resistance | = | Satisfactory |
| Adhesion to glass | = | 100% |
| 60° gloss | = | 65 |

Dry was good, with a tack-free state reached within 30-45 minutes at 25° F. and 50% relative humidity. Fast dry, good gloss and film properties characteristic of alkyds were thus attained. Stability is comparable to that of the conventional water-borne alkyds.

EXAMPLE 3

Vinyl Latex-Modified Alkyd

This shows the preparation of a very high gloss enamel.

A. Alkyd.

| Materials | Parts by Weight |
| --- | --- |
| Linseed oil fatty acids | 456 |
| Trimethylol propane | 277 |
| Isophthalic acid | 264 |
| Trimellitic anhydride | 87 |
|  | 1084 |
| Water removed | −84 |
|  | 1000 |

The linseed oil fatty acids, trimethylol propane, and isophthalic acid were charged into a resin reaction kettle equipped with agitator, thermometer and inert gas sparge. The kettle was heated to melt the charge and agitation begun. The charge was heated to 250°, held there until an acid number of about 10 was reached, and cooled to 193°. The trimellitic anhydride was added and the temperature was held at about 193° until an acid number of 60 was reached. The temperature was lowered below 160°, EGME was added to reduce nonvolatiles to 80% and the charge was filtered. Overall processing time was about 8–10 hours.

The resulting alkyd had: acid number (solids), 53; nonvolatiles, 80%; Gardner-Holdt viscosity, $Z_7+$.

B. Latex. In flask equipped with stirrer, nitrogen inlet, separatory funnel and reflux condenser were mixed the following:

| Ingredient | Parts |
| --- | --- |
| Alkyd solution above | 250 |
| Water | 550 |
| Ammonia | (to pH − 7.5) |

The above mixture was heated to 60° and maintained. The following mixture was transferred to a funnel:

| Ingredient | Parts |
| --- | --- |
| Vinyl toluene | 200 |
| Benzoyl peroxide | 0.2 |

10% of the above was added along with 2 parts of ammonium persulfate, and 1 part of sodium sulfite dissolved in 25 parts of water. The remainder was added dropwise over 2–3 hours. At the end of the addition, 1 part of ammonium persulfate and 0.5 parts of sodium sulfite in 10 parts of water was added. The mixture was held at 60° C. for approximately 1 hour and then at 90° C. for 30 minutes more. The mixture was cooled and the pH adjusted to 7.5.

A millbase of the above alkyd was made by mixing in a sand mill the following:

| Ingredient | Parts |
| --- | --- |
| Above alkyd | 18.5 |
| Water | 13.6 |
| EGME | 8.8 |
| Titanium dioxide | 50. |

The following paint was made:

| Ingredient | Parts |
| --- | --- |
| Millbase | 138 |
| Above latex | 223 |
| 6.0% cobalt naphthenate | 2.5 |
| MEK oxime | 0.6 |

This paint was spread with a doctor blade on glass. It dried within 1 hour to a 6B pencil hardness, overnight to a B hardness. The 60° gloss was 95+, the 20° gloss was 77. The film was resistant to water but was spotted by high-test gasoline overnight.

I claim:

1. An aqueous dispersion of a preformed unsaturated fatty acid alkyd resin having an emulsion polymer formed therein by means of a water-soluble emulsion catalyst, said dispersion containing 0.005–2% by weight of an oil-soluble catalyst for oxidative crosslinking.

2. A dispersion of claim 1 wherein the oil-soluble catalyst is a peroxide.

3. A dispersion of claim 2 wherein the peroxide is benzyl peroxide.

4. The process of preparing an aqueous dispersion of claim 1 which comprises:
   (A) forming an aqueous suspension of an alkyd resin;
   (B) neutralizing the suspension from (A) to a pH of about 6–9 with ammonia or a volatile amine; and
   (C) forming an emulsion polymer in the neutralized suspension from (B) with a water-soluble emulsion catalyst but in the presence also of an oil-soluble catalyst for oxidative crosslinking without decomposing the oil-soluble catalyst.

5. The process of claim 4 wherein the catalyst for emulsion polymerization is a persulfate.

6. The process of claim 5 wherein the catalyst for oxidative crosslinking is a peroxide.

7. The process of claim 6 wherein the peroxide is benzoyl peroxide.

8. In an emulsion polymerization, the step of employing simultaneously a water-soluble catalyst and an oil-soluble catalyst, thereby producing a polymer containing a residue of the oil-soluble catalyst.

9. The polymerization of claim 8 wherein the oil-soluble catalyst is a peroxide.

10. The polymerization of claim 9 wherein the peroxide is benzoyl peroxide.

\* \* \* \* \*